(12) United States Patent
Gomzin et al.

(10) Patent No.: US 10,296,471 B2
(45) Date of Patent: May 21, 2019

(54) MANAGING ACCESS TO PERIPHERAL DEVICES

(71) Applicant: HEWLETT-PACKARD DEVELOPMENT COMPANY, L.P., Houston, TX (US)

(72) Inventors: Slava Gomzin, Fisco, TX (US); Manuel Novoa, Houston, TX (US); Binh T Truong, Houston, TX (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/511,843

(22) PCT Filed: Sep. 30, 2014

(86) PCT No.: PCT/US2014/058373
§ 371 (c)(1),
(2) Date: Mar. 16, 2017

(87) PCT Pub. No.: WO2016/053310
PCT Pub. Date: Apr. 7, 2016

(65) Prior Publication Data
US 2017/0293577 A1    Oct. 12, 2017

(51) Int. Cl.
*G06F 13/10*  (2006.01)
*H04W 76/14* (2018.01)
(Continued)

(52) U.S. Cl.
CPC .......... *G06F 13/102* (2013.01); *G06F 1/1632* (2013.01); *G06F 1/1698* (2013.01); *G06F 13/14* (2013.01); *G06F 13/22* (2013.01); *G06F 13/4081* (2013.01); *G06F 21/44* (2013.01); *G06Q 20/202* (2013.01);
(Continued)

(58) Field of Classification Search
CPC ..... G06F 1/1632; G06Q 20/20; G06Q 20/202
See application file for complete search history.

(56) References Cited

U.S. PATENT DOCUMENTS 5,590,377 A   12/1996  Smith
5,805,412 A    9/1998  Yanagisawa et al.
(Continued)

FOREIGN PATENT DOCUMENTS

TW        I401601        7/2013
WO   WO-2011/007332 A1  1/2011

OTHER PUBLICATIONS

Windows Hardware Certification Requirements for Client and Server Systems, Jan. 17, 2014, pp. 1-279, Microsoft, Available at: <msdn.microsoft.com/en-us/library/windows/hardware/jj128256.aspx>.

*Primary Examiner* — Brian T Misiura
(74) *Attorney, Agent, or Firm* — HPI Patent Department (57) ABSTRACT

An example processor-implemented method for accessing peripheral devices with the present disclosure includes establishing connection between a portable computing device and a dock, determining a pairing status between the portable computing device and the dock, and managing access to at least one peripheral device by the portable computing device based on the pairing status. The dock is associated with the at least one peripheral device.

13 Claims, 5 Drawing Sheets

(51) Int. Cl.
*G06F 13/14* (2006.01)
*G06F 1/16* (2006.01)
*H04M 1/725* (2006.01)
*G06F 13/22* (2006.01)
*G06F 13/40* (2006.01)
*G06F 21/44* (2013.01)
*G06Q 20/20* (2012.01)
*H04W 12/08* (2009.01)
*H04L 29/06* (2006.01)
*H04W 84/12* (2009.01)

(52) U.S. Cl.
CPC ......... *H04M 1/7253* (2013.01); *H04W 12/08* (2013.01); *H04W 76/14* (2018.02); *H04L 63/0876* (2013.01); *H04L 63/101* (2013.01); *H04W 84/12* (2013.01)

(56) References Cited

U.S. PATENT DOCUMENTS

| | | | |
|---|---|---|---|
| 5,982,614 A | 11/1999 | Reid | |
| 7,114,656 B1 * | 10/2006 | Garver | A47F 9/048 235/462.46 |
| 8,254,992 B1 | 8/2012 | Ashenbrenner et al. | |
| 8,844,817 B2 * | 9/2014 | Glanzer | G06K 7/082 235/449 |
| 8,898,076 B2 * | 11/2014 | Vasquez | G06Q 20/3227 705/16 |
| 8,949,144 B2 * | 2/2015 | Kim | G07G 1/0018 705/16 |
| 9,058,727 B2 * | 6/2015 | Edwards | E05B 65/461 |
| 9,430,681 B2 * | 8/2016 | Hicks | G06K 7/10881 |
| 9,501,706 B2 * | 11/2016 | Williams, Jr. | G06K 9/186 |
| 9,613,356 B2 * | 4/2017 | Edwards | G06Q 20/4012 |
| 9,665,861 B2 * | 5/2017 | Fernando | G06Q 20/203 |
| 9,754,249 B2 * | 9/2017 | Takasu | G06Q 20/204 |
| 9,928,501 B1 * | 3/2018 | Edwards | G06Q 20/3226 |
| 2001/0042150 A1 | 11/2001 | Moroz et al. | |
| 2005/0257226 A1 * | 11/2005 | Belvin | G06F 9/4413 719/328 |
| 2010/0012715 A1 | 1/2010 | Williams et al. | |
| 2010/0246119 A1 | 9/2010 | Collopy et al. | |
| 2010/0251361 A1 | 9/2010 | Collopy et al. | |
| 2012/0185306 A1 | 7/2012 | Cheng | |
| 2013/0297844 A1 | 11/2013 | Rosenberg et al. | |
| 2013/0311692 A1 | 11/2013 | Huang et al. | |
| 2014/0025517 A1 | 1/2014 | Argue et al. | |
| 2014/0196112 A1 | 7/2014 | Huang et al. | |
| 2016/0132856 A1 * | 5/2016 | Nishiie | G06F 13/4081 705/24 |
| 2016/0283420 A1 * | 9/2016 | Haga | G06F 13/24 |
| 2017/0004475 A1 * | 1/2017 | White | G06Q 20/204 |
| 2017/0177029 A1 * | 6/2017 | Nguyen | G06F 1/1632 |
| 2017/0178099 A1 * | 6/2017 | Truong | G06Q 20/201 |

* cited by examiner

MANAGING ACCESS TO PERIPHERAL DEVICES

BACKGROUND

Portable or mobile computing systems, devices, and electronic components in general may be sold or configured to work with a docking station or other component adapted to receive the portable device. Such devices may require hardware or software security mechanisms to prevent unauthorized access, theft, or other unintended consequences.

Plug-and-Play (PnP) is a set of standards that allow for automatic detection and minor configuration of computer devices without user intervention. Point of sale (POS), Object Linking and Embedding for Retail POS (OPOS), and universal point of sale (UPOS) are industry standards for retail and vending technologies used around the world.

BRIEF DESCRIPTION OF THE DRAWINGS

Examples are described in the following detailed description and in reference to the drawings, in which.

DETAILED DESCRIPTION

Various aspects of the present disclosure are directed to controlling a mobile device for peripheral access in a point of sale system. More specifically, and as described in greater detail below, various aspects of the present disclosure are directed to a manner by which a portable computing device is controlled to determine which peripherals the mobile device can connect to when docked to an authenticated docking station.

Aspects of the present disclosure described herein disclose allowing the user to display content from a plurality of devices. Among other things, this approach allows remote interaction with multiple devices through one screen. The user can use touch gestures to control all the devices on the same display. Moreover, aspects of the present disclosure described herein allow multiple instances of operating systems to be displayed at the same time in a consolidated view where each instance can interact with each other. Among other things, this approach may provide the flexibility of using a single screen which is not restricted to displaying only the devices or applications that are compatible with each other.

In one example in accordance with the present disclosure, a method for managing access to at least one peripheral device is provided. The method comprises establishing connection between a portable computing device and a dock, wherein the dock is associated with at least one peripheral device, determining a pairing status between the portable computing device and the dock, and managing access to the at least one peripheral device by the portable computing device based on the pairing status.

In another example in accordance with the present disclosure, a system is provided. The system comprises a processor to execute instructions, a peripheral interface for connecting a peripheral point of sale (POS) device, and a storage device that stores instructions, the storage device comprises instructions, when executed by the process, to detect a connection to a dock associated with a peripheral POS device, determine whether the system is paired with the dock, if paired, allow access to the peripheral POS device, and if unpaired, manage access to the peripheral POS device based on default settings of the system.

In a further example in accordance with the present disclosure, a non-transitory computer readable medium is provided. The non-transitory computer-readable medium comprises instructions which, when executed, cause a device to (i) determining a pairing status between a portable computing device and a dock connected to the portable computing device and having at least one peripheral device; and (ii) managing access to the at least one peripheral device based on the pairing status.

Figure 1:
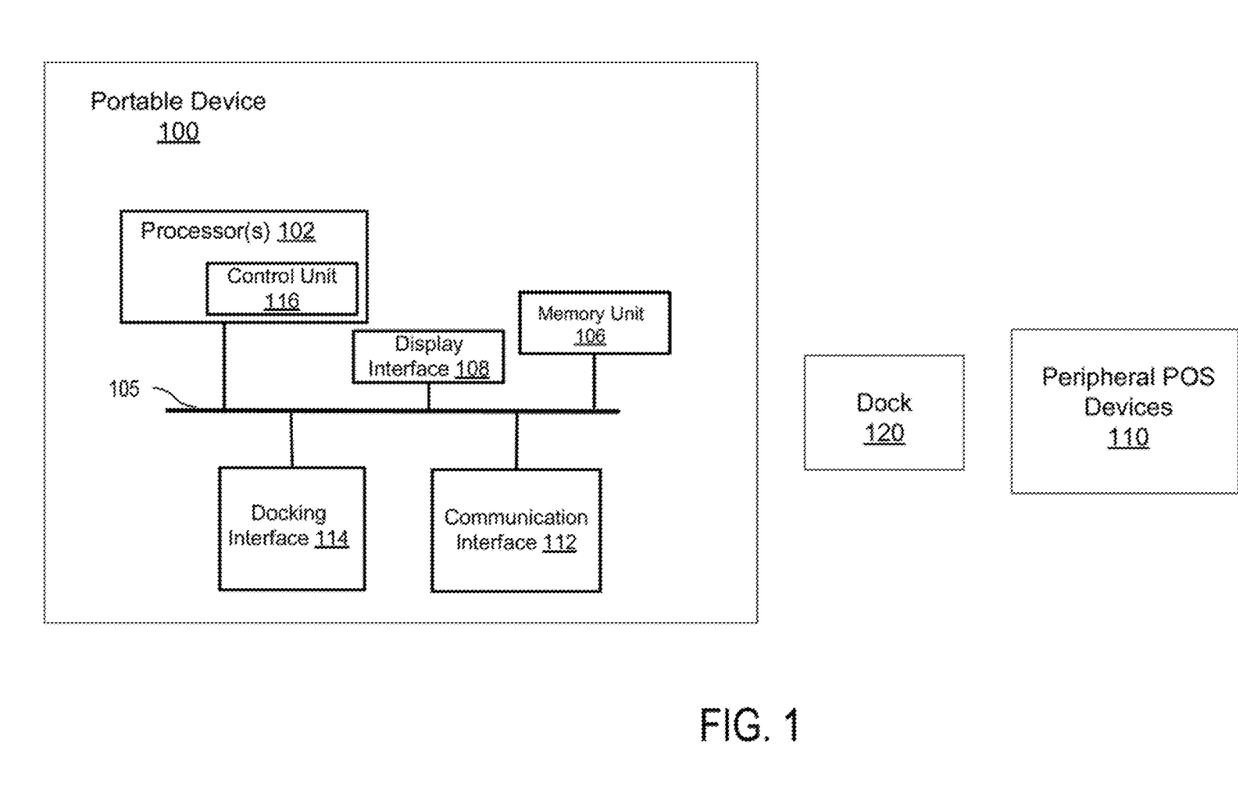
FIG. 1 illustrates an example block diagram of a portable computing device managing access to peripheral POS devices in accordance with an implementation of the present disclosure.

FIG. 1 is a schematic representation of an example portable computing device 100 with a peripheral point-of-sale (POS) retail dock 120 in accordance with the principles disclosed herein. The portable computing device 100 may be connected to the retail peripheral devices 110 with an expansion dock (e.g., active expansion jacket) 120. It should be readily apparent that the present illustration should not be interpreted to be limited by this particular illustrative architecture shown in FIG. 1, and the portable computing device 100 represents a generalized illustration and that other elements may be added or the illustrated elements may be removed, modified, or rearranged in many ways.

In one implementation, the portable computing device 100 may be a tablet. The portable computing device 100 includes a first panel and a second panel. In one implementation the first panel includes a rear panel of the portable computing device and the second panel includes a front panel of the portable computing device. The portable computing device 100 includes a sensor, such as a touch surface, a touchpad, an image capture component, and/or a proximity sensor to detect for a hand gesture at the first panel of the portable computing device. The hand gesture includes a user touching or repositioning the user's finger(s) or palm at the rear panel of the portable computing device. In one implementation, locations at the first panel correspond to locations of a virtual keyboard of the portable computing device.

The portable computing device 100 may be connected to a peripheral interface via the dock. The peripheral interface may be a USB port, a serial port, a parallel port, an Ethernet port, or any number of other communication ports. A peripheral point of sale device (e.g., peripheral devices 110), such as a portable sales terminal, a printer, a credit card reader, a bar code scanner, and the like, may be connected to the computer device 100 through the peripheral interface. The peripheral devices 110 can include but are not limited to barcode scanners, radio frequency identification (RFID) devices, POS touchscreen devices, magnetic stripe readers, electronic funds transfer (EFT) modems, digital weighing scales, POS receipt printers, line displays, and cash drawers. The peripheral devices 110, such as a smart electronic cash register, can provide core operational functionality.

The portable computing device 100 includes, but may not be limited to, a processor 102 (e.g., a central processing unit, a microprocessor, a microcontroller, or another suitable programmable device) with a control unit 116, a memory unit 106, a communication interface 112, and a docking interface 114. Each of these components or any additional components of the portable computing device 100 is operatively coupled to a bus 105. The bus 105 may be any of several types of bus structures including a memory bus or memory controller, a peripheral bus, and a local bus using any of a variety of bus architectures. In examples, the bus 105 may be a PCI, ISA, PCI-Express, HyperTransport®, NuBus, or the like. In other examples, the portable computing device 100 includes additional, fewer, or different components for carrying out similar functionality described herein.

The processor 102 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage, medium (e.g., the memory 106), or a combination thereof. The machine readable medium may be a non-transitory computer-readable medium that stores machine readable instructions, codes, data, and/or other information. The processor 102 includes a control unit 116 and may be implemented using any suitable type of processing system where at least one processor executes computer-readable instructions stored in the memory unit 106. The instructions, when executed by processor 102 (e.g., via one processing element or multiple processing elements of the processor) can cause processor 102 to perform processes described herein.

For example, some of the instructions may provide the portable computing device 100 with POS functionality. For example, the instructions may include POS applications, UPOS applications, and OPOS applications used in transactions between retailers and consumers when buying and selling goods and services. The point of sale applications can include features to implement various POS functionality, such as inventory management, customer relationship management (CRM), financials, and warehousing, for example.

Further, as mentioned above, the memory 106 may participate in providing instructions to the processor 102 for execution. The memory 106 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. As discussed in more detail above, the processor 102 may be in data communication with the machine readable medium, which may include a combination of temporary and/or permanent storage. The machine readable medium may include program memory that includes all programs and software such as an operating system, user detection software component, and any other application software programs. The machine readable medium may also include data memory that may include multicast group information, various table settings, and any other data required by any element of the ASIC.

The communication interface 112 enables the portable computing device 100 to communicate with a plurality of networks and communication links. In some examples, the communication interface of the computing device 100 may include a Wi-Fi® interface, a Bluetooth interface, a 3G interface, a 4G interface, a near field communication (NFC) interface, and/or any other suitable interface that allows the computing device to communicate via one or more networks. The networks may include any suitable type or configuration of network to allow the portable computing device 100 to communicate with any external systems or devices (e.g., the dock 120).

The docking interface 114 may be used to couple the computing device 100 to a dock, such as the dock 120. When placed in the dock 120, the computing device 100 may reestablish connections to other peripheral devices, such as printers, modems, keypads, and the like, as described herein. While in the dock 120, the computing device 100 may provide the user interface functions. In some implementations, the computing device 100 becomes an attached peripheral device when in the dock 120, for example, downloading current purchase information for completion of a purchase.

The processor 102 may be linked through the bus 105 to a display interface 108 to connect the computing device 100 to display devices. A display device may be a built-in component of the computing device 100 or connected externally to the computing device 100. The display device may also include a display screen of a smartphone, a computing tablet, a computer monitor, a television, or a projector, among others. In some examples, the display screen may include a touch screen component, for example, a touch-sensitive display. The touch screen component may allow a user to interact directly with the display screen of the display device by touching the display screen with a pointing device, one or more fingers, or a combination of both. Further, the display screen may be a transparent liquid crystal display (LCD), an organic light emitting diode (OLED) display, a plasma display, or any other suitable display. The display screen is to display content from one or more applications communicated to the computing device 100 on a window shown on the display screen. In one implementation, the display screen comprises various display properties such as resolution, display pixel density, display orientation and/or display aspect ratio. The display screen may be of different sizes and may support various types of display resolution, where display resolution is the number of distinct pixels in each dimension that can be displayed on the display screen. For example, the display screen may support high display resolutions of 1920×1080, or any other suitable display resolutions. When the display screen supports a 1920×1080 display resolution, 1920 is the total number of pixels across the height of the display and 1080 is the total number of pixels across the height of the display.

In one implementation, as discussed above, the computing device 100 can be docked into the dock 120 to connect to the peripheral POS devices 110 associated with the dock 120. In order to achieve the connection between the computing device 100 and the peripheral devices 110, the computing device 100 may be paired with the dock 120. Such pairing is performed one time, which authorizes the computing device 100 to access the peripheral devices 110 associated with the dock 120. From that point forward, the pairing provides the connection in addition to synchronization of data between the computing device 100 and the peripheral devices 110. In some examples, the computing device 100 may be paired with more than one dock 120.

In order to achieve the pairing of the computing device 100 with the dock 120, the computing device 100 may be docked into the dock 120. In another implementation, the computing device 100 and the dock 120 may be connected via any connectivity mechanism (e.g., Wi-Fi, network, Bluetooth) or using near-field-communication (NFC). For example, a receiver may be implemented on the computing device 100, and when the dock 120 is moved within the NFC range, the computing device 100 may automatically detect the dock 120 and pair with the dock 120 initiating the display of an instance from the peripheral POS devices 110 associated with the dock 120. In another implementation, the computing device 100 may have a Bluetooth low energy beacon, which can be used to automatically recognize the docks (e.g., the dock 120) within the Bluetooth zone. At that point, the computing device 100 may send a message to the dock 120 to pair with it automatically. In a further implementation, the computing device 100 may have a QR code, and the dock 120 may be used to capture an image of the QR code to initiate the pairing. In another implementation, a public or private webserver (e.g., URL to the internet) related to the computing device 100 can be used to register the dock 120, which will initiate a TCP or socket connection.

In one implementation, an operating system in the computing device 100 may run to handle the pairing process. For example, the computing device 100 may be a Windows tablet and may run an instance on Windows operating system, utilizing the resources (e.g., processor, memory) of the computing device 100. Access to the peripheral devices 110 may be controlled by the control unit 116, which is the operating system service component (e.g., Windows Service) in the computing device 100. The operating system service component provides, for example, binding and validating services for the computing device 100. In one implementation, the control unit 116 may be called a dock manager. In one example, the dock manager may be set to load and execute upon boot/initialization of the computing device 100. The control unit 116 runs instructions, when executed by the processor 102 can, cause processor 102 to perform processes described herein.

In one implementation, the control unit 116 may be available in a master computing device, which may be used to control a plurality of computing devices that dock into docking stations, such as the dock 120. In another implementation, the control unit 116 may be utilized in a hub network of a plurality of docking stations including the dock 120. Accordingly, the control unit 116 may control a plurality of docks.

Figure 2A:
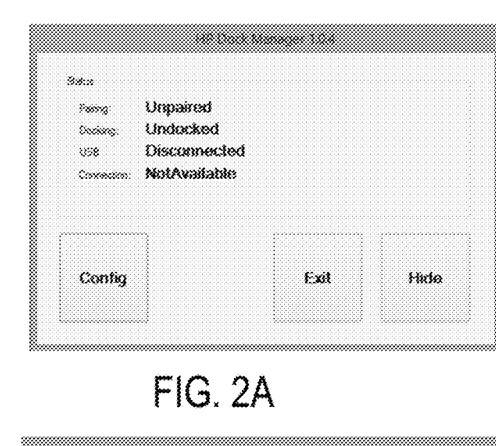
FIGS. 2A-2D illustrate example interfaces on the computing device in accordance with an implementation.
Figure 2B:
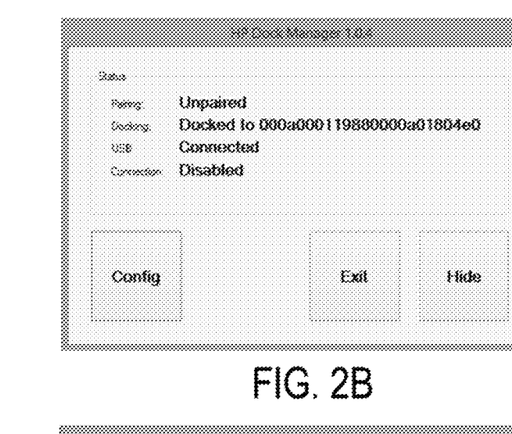

FIGS. 2A and 2B illustrate examples of user interfaces of the dock manager in a computing device (e.g., the computing device 100 of FIG. 1). As illustrated in FIG. 2A, the dock manager provides a status screen summarizing the connection between the computing device and dock. In one implementation, the status screen is available as a windows tray application, which can be launched via a tray icon. For example, FIG. 2A illustrates a situation where the computing device is not paired with a dock (e.g., unpaired), and, is not docked to a dock (e.g., undocked). In this example, the config button shown in FIG. 2A is available. A user with required permission settings (e.g., administrator) may be able to click on the config button to configure the dock manager. More specifically, the config button may be selected, and a configuration screen may be accessed. Such screen provides a pair button, which leads to a pair option available for the computing device to detect a dock and pair with. If the user chooses to pair the computing device with the dock, the pairing status changes from unpaired to paired. This will be described in more detail in reference to FIG. 4.

FIG. 2B illustrates another example of a status summary of the computing device. As shown in FIG. 2B, the computing device is docked to a specific dock, and the ID of such dock is presented on the summary screen. The status summary also shows that the computing device is not paired (e.g., unpaired) with the dock that it is connected to. Accordingly, the config option is available to pair the device (e.g., once config selected, a new screen with the pair button is shown). In both FIGS. 2A and 2B, it is shown that the user is also provided with the option to exit the dock manager screen or hide the screen. It should be readily apparent that the present illustrations should not be interpreted to be limited by this particular illustrative architecture shown in FIGS. 2A and 2B, and the user interfaces represent a generalized illustration and that other elements may be added or the illustrated elements may be removed, modified, or rearranged in many ways.

Figure 2C:
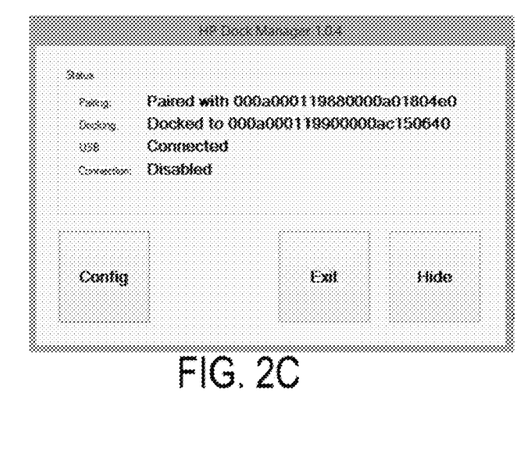
Figure 2D:
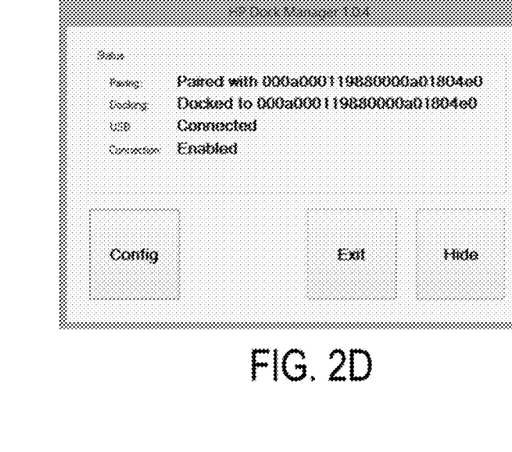

Further, FIGS. 2C and 2D illustrate additional examples of user interfaces of the dock manager in the computing device (e.g., the computing device 100 of FIG. 1). Similar to FIGS. 2A and 2B, FIGS. 2C and 2D illustrate status screens of a dock manager. The status screens summarize the connection between the computing device and dock. For example, FIG. 2C illustrates a situation where the computing device is paired with a dock (e.g., paired), but is not docked to the dock that is paired with (e.g., docked and disabled). Accordingly, access to the peripheral devices associated with the dock is disabled. Moreover, FIG. 2D illustrates a situation where the computing device is paired with a dock (e.g., paired), and is docked to the dock that is paired with (e.g., docked and enabled). Accordingly, access to the peripheral devices associated with the dock is enabled.

The user interacting with the screens illustrated in FIGS. 2A-2D includes an administrator or manager of the computing device 100 as the pairing process can be accessed by the administrator, and may not be available to other users of the computing device 100.

Figure 3:
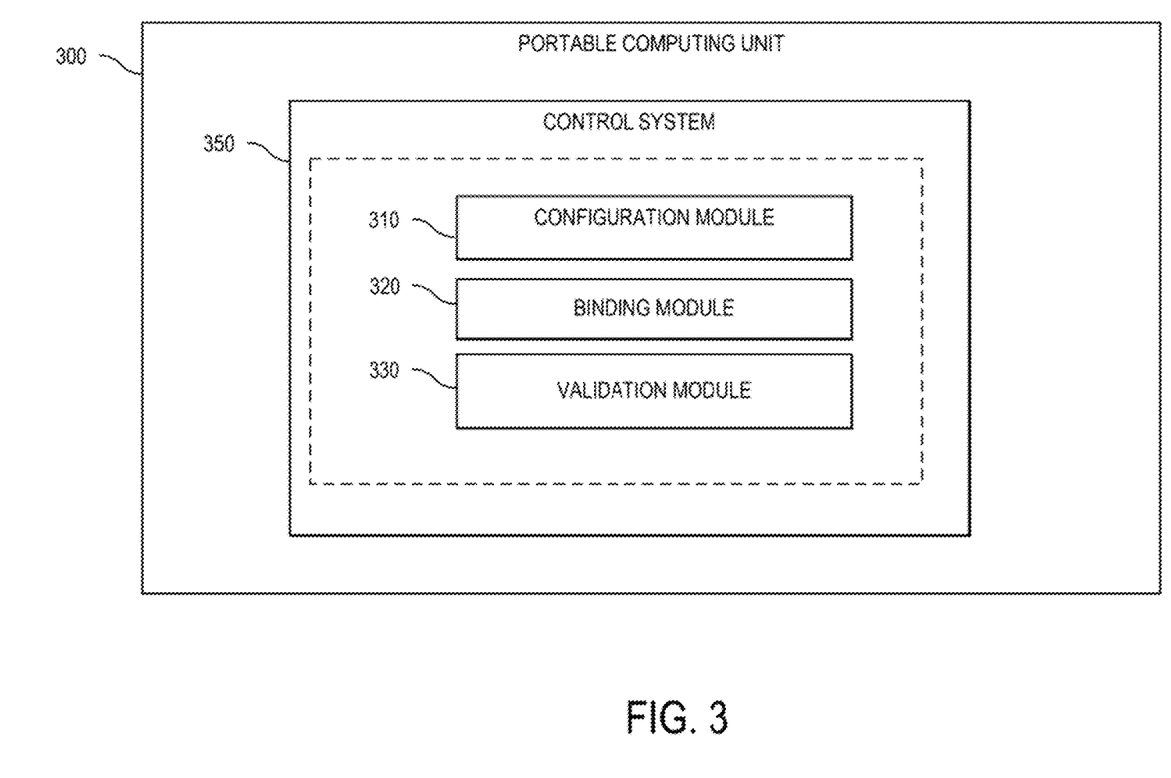
FIG. 3 illustrates an example computer system to manage access to peripheral devices at an expansion dock in accordance with an implementation.

FIG. 3 illustrates an example of a computing device 300 to access multiple peripheral devices, and such access is managed by a control system 350. The control system 350 illustrated in FIG. 3 includes various modules to implement the functionalities described herein. The control system 350 may include at least a configuration module 310, a binding module 320, and a validation module 330. Although the various modules 310-330 are shown as separate modules in FIG. 3, in other implementations, the functionality of all or a subset of the modules 310-330 may be implemented as a single engine.

Each of the modules of system 350 may be any suitable combination of hardware and programming to implement the functionalities of the respective module. Such combinations of hardware and programming may be implemented in a number of different ways. For example, the programming for the modules may be processor executable instructions stored on a non-transitory machine-readable storage medium and the hardware for the engines may include a processing resource to execute those instructions. In such examples, the machine-readable storage medium may store instructions that, when executed by the processing resource, implement the control system 350. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry.

The configuration module 310 acts as a configuration tool to set default actions. For example, the configuration module allows a user to provide default settings for the computing device. Further, the configuration module 310 may provide an option to set default action in an unpaired state. For example, the computing device may be set to have access to any peripheral devices associated with a dock that the computing device is docked to without having to be paired with the dock. Accordingly, in such implementation, the configuration settings may not require that the computing device is paired with the dock. In another implementation, the configuration module 310 may provide an ability to enter windows device ID. Based on the device ID entered, the control system may determine whether such device is blocked from accessing the peripheral devices associated with the dock. In a further implementation, the configuration module 310 may provide an interface with buttons to pair and/or unpair the computing device 300 with the dock.

The binding module 320 handles the pairing the computing device 300 with a dock via an operating system, such as iOS®, Windows®, Android, and any other suitable operating system. In one implementation, the operating system is stored in a memory (e.g., the memory 108 as shown in FIG. 1) performs various tasks related to the use and operation of the computing device 300. Such task may include recognizing input from users, such as touch on the display screen, coordination of the interaction between a plurality of docks with the computing device 300, and managing traffic on bus (e.g., as shown in FIG. 1). For example, when a user requests to access peripheral devices, the binding module 320 pairs the computing device 300 and the dock that the peripheral devices are associated with.

The validation module 330 includes various components for establishing and maintaining device connections, and supports the pairing process between the computing device 300 and a dock. When the computing device 300 is docked, the validation module 330 performs initialization methods and checks whether the computing device 300 and the dock are paired. If the computing device 300 and the expansion dock are paired, new threads are opened to initiate communications with peripheral devices attached to the dock. If the computing device 300 and the expansion dock are not paired, the computing device 300 may be denied from accessing the peripheral devices associated with the dock. In one implementation, as mentioned above, the default access permission setting for a docked computing device in an unpaired state may be to allow access to all peripheral devices (i.e., no blocked device IDs). In such an implementation, any peripheral device associated with the dock may be accessed by the computing device 300.

Figure 4:
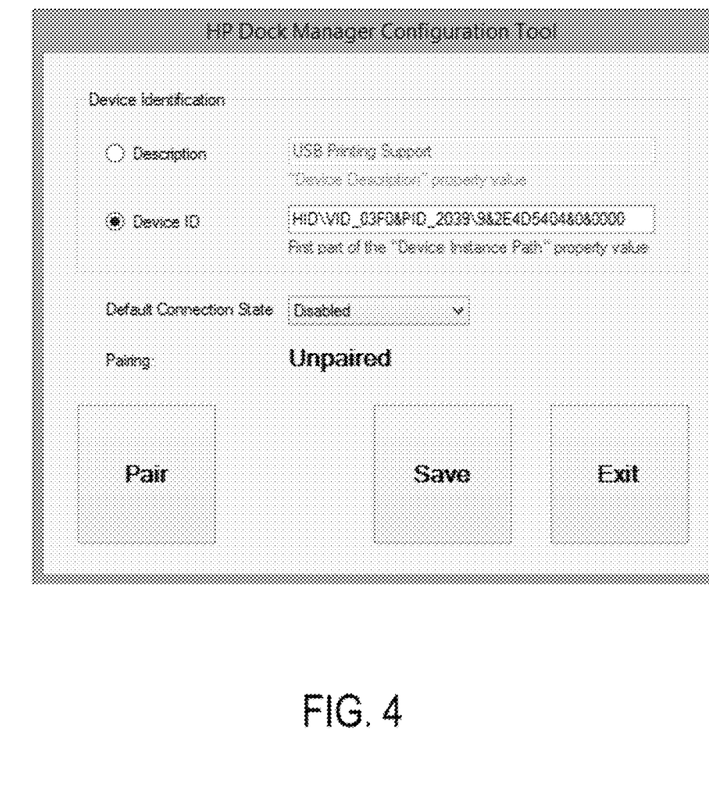
FIG. 4 illustrates an example interface of a configuration screen on the computing device in accordance with an implementation.

FIG. 4 illustrates an example of a user interface of a configuration screen in a computing device (e.g., the computing device 100 of FIG. 1). As illustrated in FIG. 4, a dock manager in the computing device provides a configuration screen. The configuration screen includes a pair button. For example, a command to pair the computing device with a dock may be received from a user. The user may provide this command by clicking on the pair button. More specifically, FIG. 4 illustrates a situation where the pairing status is unpaired, and a configuration module may allow a user to pair the dock with the computing device. The user may select the pair option on the user interface to be able to submit a request to pair the computing device with the dock, in which case, the binding module initiates the pairing process. The command is delivered to the device, and the device performs the command. In another implementation, the pairing status may be paired, and a configuration module may allow a user to unpair the dock from the computing device (not shown in Fig.).

In one implementation, the user interacting with the configuration screen illustrated in FIG. 4 may be limited to an administrator or manager of the computing device 100 as, in such an implementation, the pairing process may be performed by a limited group of users, such as the administrator, and may not be available to other users of the computing device 100.

Figure 5:
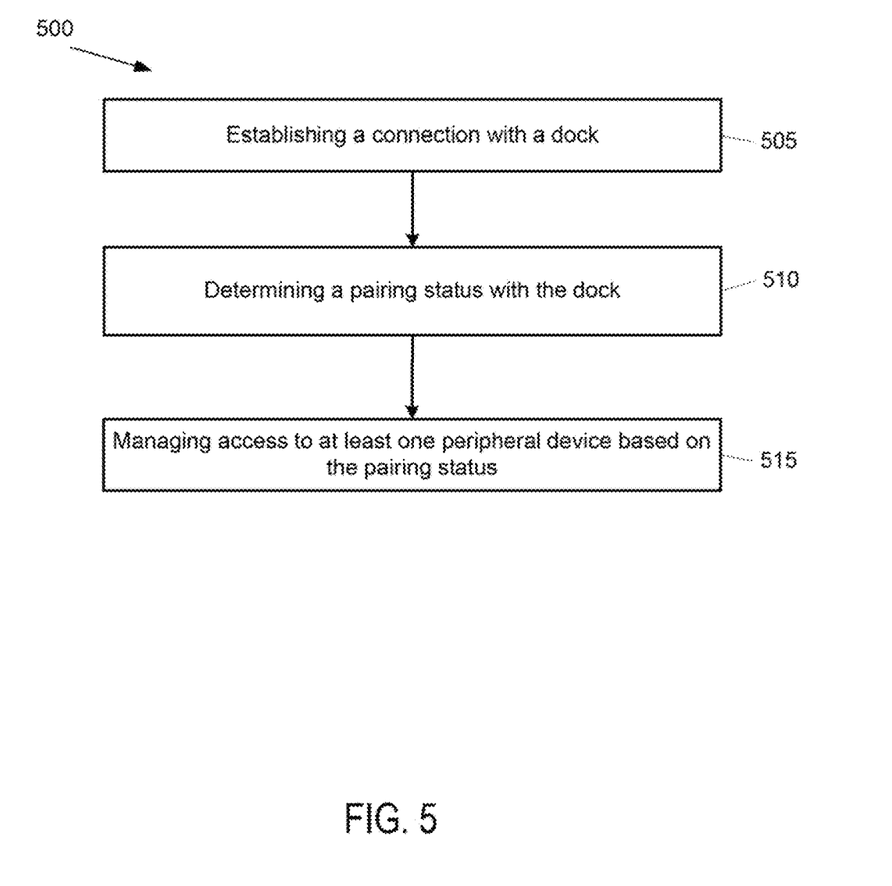
FIG. 5 illustrates example process flow diagrams in accordance with an implementation.

Turning now to the operation of the system 100, FIG. 5 depicts a process flow diagram 500 in accordance with an example implementation. It should be readily apparent that the processes depicted in FIG. 5 represent generalized illustrations, and that other processes may be added or the illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the computing device 500.

The illustrated process 500 begins at block 505, where a connection is established between a portable computing device and a dock. In particular, this includes the step of docking the portable computing device to the dock. When the connection is established, the status of the computing device is updated from undocked to docked. Further, the dock is associated with at least one peripheral device. By docking the portable computing device to the dock, a user of the computing device may request to access peripheral devices connected to the dock.

At block 510, a pairing status is determined between the portable computing device and the dock. More specifically, a binding module in the system determines whether the computing device is paired with the dock that it is connected to. In other implementations, the binding module may determine if the computing device is paired with any docks. If paired, the binding module may determine whether the dock that the computing device is connected to is one of the docks that the computing device is paired with. The binding module uses device ID of the computing device or dock or peripheral devices that are connected to the dock to identify blocked or unblocked devices.

At block 515, the system manages access to the at least one peripheral device by the portable computing device based on the pairing status. In one example, the pairing status may be paired, and in another example, the pairing status may be unpaired. The pairing status of paired represents an unblocked computing device, and the unblock device may access peripheral devices that are connected to the dock. More specifically, the system allows the computing device docked to the dock to access the peripheral devices connected to the dock if the pairing status is paired. Moreover, the pairing status of unpaired represents a blocked computing device, and the block device is prohibited from accessing peripheral devices that are connected to the dock. More specifically, the system denies access to the peripheral devices that are connected to the dock if the computing device is not paired to the dock.

In some example, the default access setting of a computing device docked to a dock may allow full access to the peripheral devices connected to the dock even if the dock and computing device are not paired. A user of the computing device may be allowed to change the default settings if permission is given to that user (e.g., administrator role of the computing device).

In one implementation, a command to pair the computing device with a dock may be received from a user. The command is delivered to the device, and the device performs the command. More specifically, if the pairing status is unpaired, a configuration module may allow a user to pair the dock with the computing device. The user may select the pair option on the user interface to be able to submit a request to pair the computing device with the dock, in which case, the binding module initiates the pairing process.

While the above disclosure has been shown and described with reference to the foregoing examples, it should be understood that other forms, details, and implementations may be made without departing from the spirit and scope of the disclosure that is defined in the following claims.

What is claimed is:

1. A processor-implemented method for managing access to peripheral point of sale (POS) devices, comprising:
    establishing connection between a portable computing device and a dock, wherein the dock is associated with at least one peripheral POS device;
    determining a pairing status between the portable computing device and the dock; and
    managing access to the at least one peripheral POS device by the portable computing device based on the pairing status, wherein managing access to the at least one peripheral POS device by the portable computing device based on the pairing status further comprises:
        checking default access permission settings corresponding to the pairing status of unpaired; and
        allowing access to the at least one peripheral POS device if the default access permission settings is allow all.

2. The method of claim 1, wherein establishing the connection between the portable computing device and the dock comprises docking the portable computing device to the dock.

3. The method of claim 1, wherein the pairing status between the portable computing device and the dock is paired.

4. The method of claim 3, further comprising allowing the portable computing device to access the at least one peripheral POS device.

5. The method of claim 1, wherein the pairing status between the portable computing device and the dock is unpaired.

6. The method of claim 5, further comprising blocking access to the at least one peripheral POS device.

7. The method of claim 1, wherein the at least one peripheral POS device comprises a universal point of sale system including a portable sales terminal, a printer, a credit card reader, or a bar code scanner.

8. The method of claim 1, further comprising using a control interface to perform initialization methods on the at least one peripheral POS device.

9. The method of claim 5, further comprising:
    receiving, from a user, a command to configure settings of the computing device, wherein the settings comprise an option to pair the computing device and the dock; and
    initiating the command to pair the computing device and the dock.

10. A system for managing access to a peripheral point of sale (POS) device, comprising:
    a processor to execute instructions;
    a docking interface for connecting a peripheral point of sale (POS) device; and
    a storage device that stores instructions, the storage device comprises instructions, when executed by the processor, to:
        detect a connection to a dock associated with a peripheral POS device;
        determine a pairing status with the dock;
        if the pairing status is paired, allow access to the peripheral POS device; and
        if the pairing status is unpaired, manage access to the peripheral POS device based on default settings of the system,
            wherein the instructions to manage access to the peripheral POS device based on default settings of the system further comprise instructions to check default access permission settings corresponding to the pairing status of unpaired and
            wherein the instructions further comprise instructions to allow access to the peripheral POS device if the default access permission settings is allow all.

11. The system of claim 10, wherein the system further comprises a display interface and a communication interface.

12. A non-transitory computer-readable medium comprising instructions which, when executed, cause a system to:
    determine a pairing status between a portable computing device and a dock connected to the portable computing device and having at least one peripheral point of sale (POS) device;
    manage access to the at least one peripheral (POS) device based on the pairing status;
    check default access permission settings corresponding to the pairing status of unpaired; and
    allow access to the at least one peripheral POS device if the default access permission settings is allow all.

13. The non-transitory computer-readable medium of claim 12, further comprising pairing the portable computing device with the dock if the pairing status is unpaired.

* * * * *

UNITED STATES PATENT AND TRADEMARK OFFICE
CERTIFICATE OF CORRECTION

| | | |
|---|---|---|
| PATENT NO. | : 10,296,471 B2 | Page 1 of 1 |
| APPLICATION NO. | : 15/511843 | |
| DATED | : May 21, 2019 | |
| INVENTOR(S) | : Slava Gomzin et al. | |

It is certified that error appears in the above-identified patent and that said Letters Patent is hereby corrected as shown below:

On the Title Page

In item (72), Inventors, in Column 1, Line 1, delete "Fisco, TX" and insert -- Frisco, TX --, therefor.

Signed and Sealed this
Twenty-eighth Day of April, 2020

Andrei Iancu
*Director of the United States Patent and Trademark Office*